United States Patent
Zhang et al.

(10) Patent No.: US 12,260,623 B2
(45) Date of Patent: Mar. 25, 2025

(54) TRAINING METHOD AND APPARATUS FOR IMAGE REGION SEGMENTATION MODEL, AND IMAGE REGION SEGMENTATION METHOD AND APPARATUS

(71) Applicant: TENCENT TECHNOLOGY (SHENZHEN) COMPANY LIMITED, Shenzhen (CN)

(72) Inventors: Jun Zhang, Shenzhen (CN); Kuan Tian, Shenzhen (CN); Kezhou Yan, Shenzhen (CN); Jianhua Yao, Shenzhen (CN); Xiao Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 399 days.

(21) Appl. No.: 17/707,045

(22) Filed: Mar. 29, 2022

(65) Prior Publication Data
US 2022/0222932 A1 Jul. 14, 2022

Related U.S. Application Data

(63) Continuation of application No. PCT/CN2021/087128, filed on Apr. 14, 2021.

(30) Foreign Application Priority Data

May 18, 2020 (CN) .......................... 202010419791.7

(51) Int. Cl.
*G06K 9/00* (2022.01)
*G06T 7/11* (2017.01)
(Continued)

(52) U.S. Cl.
CPC ............ *G06V 10/7747* (2022.01); *G06T 7/11* (2017.01); *G06T 7/194* (2017.01); *G06V 10/82* (2022.01)

(58) Field of Classification Search
CPC .. G06V 10/7747; G06V 10/82; G06V 20/695; G06T 7/11; G06T 7/194;
(Continued)

(56) References Cited

U.S. PATENT DOCUMENTS 11,282,208 B2 * 3/2022 Cohen ........................ G06T 7/12
11,587,301 B2 * 2/2023 Deng ..................... G06V 10/82
(Continued)

FOREIGN PATENT DOCUMENTS

CN 106651886 A * 5/2017 ........... G06K 9/6223
CN 107424159 A * 12/2017 ........... G06N 3/0454
(Continued)

OTHER PUBLICATIONS

International Search Report with English translation and Written Opinion regarding PCT/CN2021/087128 dated May 26, 2021, 11 pages.

(Continued)

*Primary Examiner* — Shervin K Nakhjavan
(74) *Attorney, Agent, or Firm* — Crowell & Moring LLP

(57) ABSTRACT

Embodiments of this application disclose a method and apparatus for training an image region segmentation model, and an image region segmentation method and apparatus. The method includes acquiring a sample image set, and each image of the sample image set having first annotation information; generating graph structure data corresponding to a sample image in the sample image set, the graph structure data comprising multiple nodes, and each node comprising at least one pixel in the sample image; determining second annotation information of each node accord- (Continued)

ing to the graph structure data and the first annotation information corresponding to the sample image by using a graph convolutional network model, a granularity of the second annotation information being smaller than a granularity of the first annotation information, the graph convolutional network model being a part of an image segmentation model; and training the image segmentation model according to the second annotation information.

17 Claims, 9 Drawing Sheets

(51) Int. Cl.
    *G06T 7/194*     (2017.01)
    *G06V 10/774*     (2022.01)
    *G06V 10/82*     (2022.01)

(58) Field of Classification Search
    CPC ........... G06T 7/162; G06T 2207/20081; G06T 2207/20084; G06N 3/045; G06N 3/08
    See application file for complete search history.

(56) References Cited

U.S. PATENT DOCUMENTS

| | | | |
|---|---|---|---|
| 2015/0016668 A1 | 1/2015 | Cheriyadat et al. | |
| 2017/0287134 A1* | 10/2017 | Abedini | G06V 10/457 |
| 2018/0276815 A1 | 9/2018 | Xu et al. | |
| 2022/0092789 A1* | 3/2022 | Li | G06N 3/084 |
| 2022/0343623 A1* | 10/2022 | Li | G06T 7/11 |

FOREIGN PATENT DOCUMENTS

| | | | | | |
|---|---|---|---|---|---|
| CN | 109447998 A | * | 3/2019 | ........... | G06K 9/6269 |
| CN | 109903314 A | | 6/2019 | | |
| CN | 109949302 A | | 6/2019 | | |
| CN | 109961444 A | * | 7/2019 | ........... | G06K 9/4671 |
| CN | 110070531 A | * | 7/2019 | ......... | G06K 9/00617 |
| CN | 110210487 A | | 9/2019 | | |
| CN | 110232696 A | | 9/2019 | | |
| CN | 110503654 A | | 11/2019 | | |
| CN | 110659692 A | | 1/2020 | | |
| CN | 111598900 A | | 8/2020 | | |
| CN | 113272859 A | * | 8/2021 | .............. | A61B 6/032 |
| CN | 110796661 B | * | 5/2022 | ........... | G06N 3/0454 |
| CN | 110807754 B | * | 5/2022 | ........... | G06T 7/0012 |
| CN | 109671068 B | * | 9/2022 | ........... | G06T 7/0012 |
| CN | 110853009 B | * | 4/2023 | ........... | G06K 9/0061 |

OTHER PUBLICATIONS

Chinese Office Action with English concise explanation regarding CN202010419791.7 dated Apr. 24, 2022.

* cited by examiner

TRAINING METHOD AND APPARATUS FOR IMAGE REGION SEGMENTATION MODEL, AND IMAGE REGION SEGMENTATION METHOD AND APPARATUS

RELATED APPLICATION

This application is a continuation application of PCT Patent Application No. PCT/CN2021/087128, filed on Apr. 14, 2021, which claims priority to Chinese Patent Application No. 202010419791.7, filed with the China National Intellectual Property Administration on May 18, 2020, both of which are incorporated herein by reference in their entireties.

FIELD OF THE TECHNOLOGY

This application relates to the field of artificial intelligence, and in particular, to an image region segmentation technology.

BACKGROUND OF THE DISCLOSURE

With development of computer technologies, an image segmentation technology is increasingly widely used, such as medical image segmentation and natural image segmentation. The image segmentation technology is a technology in which an image is divided into several specific regions with unique properties, and a target of interest is extracted therefrom. For example, in a medical image segmentation scenario, a lesion in a medical image may be segmented for further analysis.

Deep learning is now widely used in the field of image region segmentation. To reduce time and labor costs for generating a large quantity of annotated images, in a related technology, image-level annotation is used for completing image region segmentation by using a weakly supervised mode.

However, by using weak supervision of image-level labels, a supervised signal is too weak to precisely segment a target region of interest.

SUMMARY

To resolve the foregoing technical problem, this application provides a training method and apparatus for an image region segmentation model, and an image region segmentation method and apparatus, which improve precision of a trained image region segmentation model on the premise of implementing large-scale fast annotation, and further improve precision of image segmentation when image region segmentation is performed by using the trained image region segmentation model.

The present disclosure describes a method for training an image segmentation model. The method includes acquiring, by a device, a sample image set comprising multiple sample images, and each image of the sample image set having first annotation information. The device includes a memory storing instructions and a processor in communication with the memory. The method further includes generating, by the device, graph structure data corresponding to a sample image in the sample image set, the graph structure data comprising multiple nodes, and each node comprising at least one pixel in the sample image; determining, by the device, second annotation information of each node according to the graph structure data and the first annotation information corresponding to the sample image by using a graph convolutional network model, a granularity of the second annotation information being smaller than a granularity of the first annotation information, the graph convolutional network model being a part of an image segmentation model; and training, by the device, the image segmentation model according to the second annotation information.

The present disclosure describes an apparatus for training an image segmentation model. The apparatus includes a memory storing instructions; and a processor in communication with the memory. When the processor executes the instructions, the processor is configured to cause the apparatus to perform: acquiring a sample image set comprising multiple sample images, and each image of the sample image set having first annotation information; generating graph structure data corresponding to a sample image in the sample image set, the graph structure data comprising multiple nodes, and each node comprising at least one pixel in the sample image; determining second annotation information of each node according to the graph structure data and the first annotation information corresponding to the sample image by using a graph convolutional network model, a granularity of the second annotation information being smaller than a granularity of the first annotation information, the graph convolutional network model being a part of an image segmentation model; and training the image segmentation model according to the second annotation information.

The present disclosure describes a non-transitory computer-readable storage medium, storing computer-readable instructions. The computer-readable instructions, when executed by a processor, are configured to cause the processor to perform: acquiring a sample image set comprising multiple sample images, and each image of the sample image set having first annotation information; generating graph structure data corresponding to a sample image in the sample image set, the graph structure data comprising multiple nodes, and each node comprising at least one pixel in the sample image; determining second annotation information of each node according to the graph structure data and the first annotation information corresponding to the sample image by using a graph convolutional network model, a granularity of the second annotation information being smaller than a granularity of the first annotation information, the graph convolutional network model being a part of an image segmentation model; and training the image segmentation model according to the second annotation information.

According to another aspect, an embodiment of this application provides a training method for an image region segmentation model, performed by a data processing device and including:

acquiring a sample image set, the sample image set including at least one sample image, and each sample image having first annotation information corresponding to the sample image;

generating graph structure data corresponding to a target sample image for the target sample image in the sample image set; the graph structure data including multiple nodes, and each node including at least one pixel in the target sample image; and the target sample image being any sample image in the sample image set;

determining second annotation information of the node according to the graph structure data corresponding to the target sample image and the first annotation information corresponding to the target sample image by using a graph convolutional network model; a granularity of the second annotation information being less than a granularity of the first annotation information; and the graph convolutional network model being a part of the image region segmentation model; and training the image region segmentation model according to the second annotation information.

According to another aspect, an embodiment of this application provides a training apparatus for an image region segmentation model, including an acquiring unit, a generation unit, a determining unit, and a training unit, where the acquiring unit is configured to acquire a sample image set, the sample image set including at least one sample image, and each sample image having first annotation information corresponding to the sample image;

the generation unit is configured to generate graph structure data corresponding to a target sample image for the target sample image in the sample image set; the graph structure data including multiple nodes, and each node including at least one pixel in the target sample image; and the target sample image being any sample image in the sample image set;

the determining unit is configured to determine second annotation information of the node according to the graph structure data corresponding to the target sample image and the first annotation information corresponding to the target sample image by using a graph convolutional network model; a granularity of the second annotation information being less than a granularity of the first annotation information; and the graph convolutional network model being a part of the image region segmentation model; and the training unit is configured to train the image region segmentation model according to the second annotation information.

According to another aspect, an embodiment of this application provides an image region segmentation method, performed by a data processing device and including:

acquiring a to-be-segmented image;

generating, by using an image region segmentation model, graph structure data corresponding to the to-be-segmented image; the graph structure data including multiple nodes, and each node including at least one pixel in the to-be-segmented image; the image region segmentation model being obtained through training according to second annotation information, and the second annotation information being determined according to graph structure data corresponding to a sample image and first annotation information corresponding to the sample image; and a granularity of the second annotation information being less than a granularity of the first annotation information; and obtaining a target region in the to-be-segmented image through segmentation according to the graph structure data corresponding to the to-be-segmented image by using the image region segmentation model.

According to another aspect, an embodiment of this application provides an image region segmentation apparatus, including an acquiring unit, a generation unit, and a segmentation unit, where the acquiring unit is configured to acquire a to-be-segmented image;

the generation unit is configured to generate, by using an image region segmentation model, graph structure data corresponding to the to-be-segmented image; the graph structure data including multiple nodes, and each node including at least one pixel in the to-be-segmented image; the image region segmentation model being obtained through training according to second annotation information, and the second annotation information being determined according to graph structure data corresponding to a sample image and first annotation information corresponding to the sample image; and a granularity of the second annotation information being less than a granularity of the first annotation information; and the segmentation unit is configured to obtain a target region in the to-be-segmented image through segmentation according to the graph structure data corresponding to the to-be-segmented image by using the image region segmentation model.

According to another aspect, an embodiment of this application provides a medical device, including an image collection module, an image processing module, and an image display module, where the image collection module is configured to acquire a to-be-segmented image; the to-be-segmented image being a pathological image that includes a biological tissue;

the image processing module is configured to generate, by using an image region segmentation model, graph structure data corresponding to the to-be-segmented image; the graph structure data including multiple nodes, and each node including at least one pixel in the to-be-segmented image; the image region segmentation model being obtained through training according to second annotation information, and the second annotation information being determined according to graph structure data corresponding to a sample image and first annotation information corresponding to the sample image; and a granularity of the second annotation information being less than a granularity of the first annotation information; and obtain a lesion in the to-be-segmented image through segmentation according to the graph structure data corresponding to the to-be-segmented image by using the image region segmentation model; and the image display module is configured to display the lesion.

According to another aspect, an embodiment of this application provides a device, including a processor and a memory;

the memory being configured to store program code and transmit the program code to the processor;

the processor being configured to perform the method according to the first aspect or the third aspect according to instructions in the program code.

According to another aspect, an embodiment of this application provides a computer-readable storage medium, configured to store program code, the program code being used for performing the method according to the first aspect or the third aspect.

According to another aspect, an embodiment of this application provides a computer program product including instructions, the instructions, when being run on a computer, causing the computer to perform the method according to the first aspect or the third aspect.

It can be learned from the foregoing technical solutions that, in this application, in a model training process, a sample image set is acquired, where the sample image set includes at least one sample image, each sample image has first annotation information corresponding to the sample image, and the first annotation information may be annotation information with a relatively large granularity such as an image level, so that large-scale fast annotation is easily implemented. For a target sample image in the sample image set (which may be any sample image in the sample image set), graph structure data corresponding to the target sample image is generated, where the graph structure data includes multiple nodes, and each node includes at least one pixel in the target sample image. Second annotation information of the node is determined according to the graph structure data corresponding to the target sample image and first annotation information corresponding to the target sample image by using a graph convolutional network model, where a granularity of the second annotation information is less than a granularity of the first annotation information. The node is actually a superpixel, and includes at least one pixel. That is, the second annotation information is a superpixel-level annotation. In this way, an image region segmentation model including a graph convolutional network model is trained according to the second annotation information, and interference based on the pixel-level annotation can be strongly supervised, thereby improving precision of the trained image region segmentation model. It can be learned that, in this application, on the premise of implementing large-scale fast annotation, image-level annotation information is converted into superpixel-level annotation information based on the graph convolutional network model, thereby implementing relatively strongly supervised model training, improving precision of the model, and improving precision of image segmentation when image region segmentation is performed by using the trained model.

DESCRIPTION OF EMBODIMENTS

Figure 1:
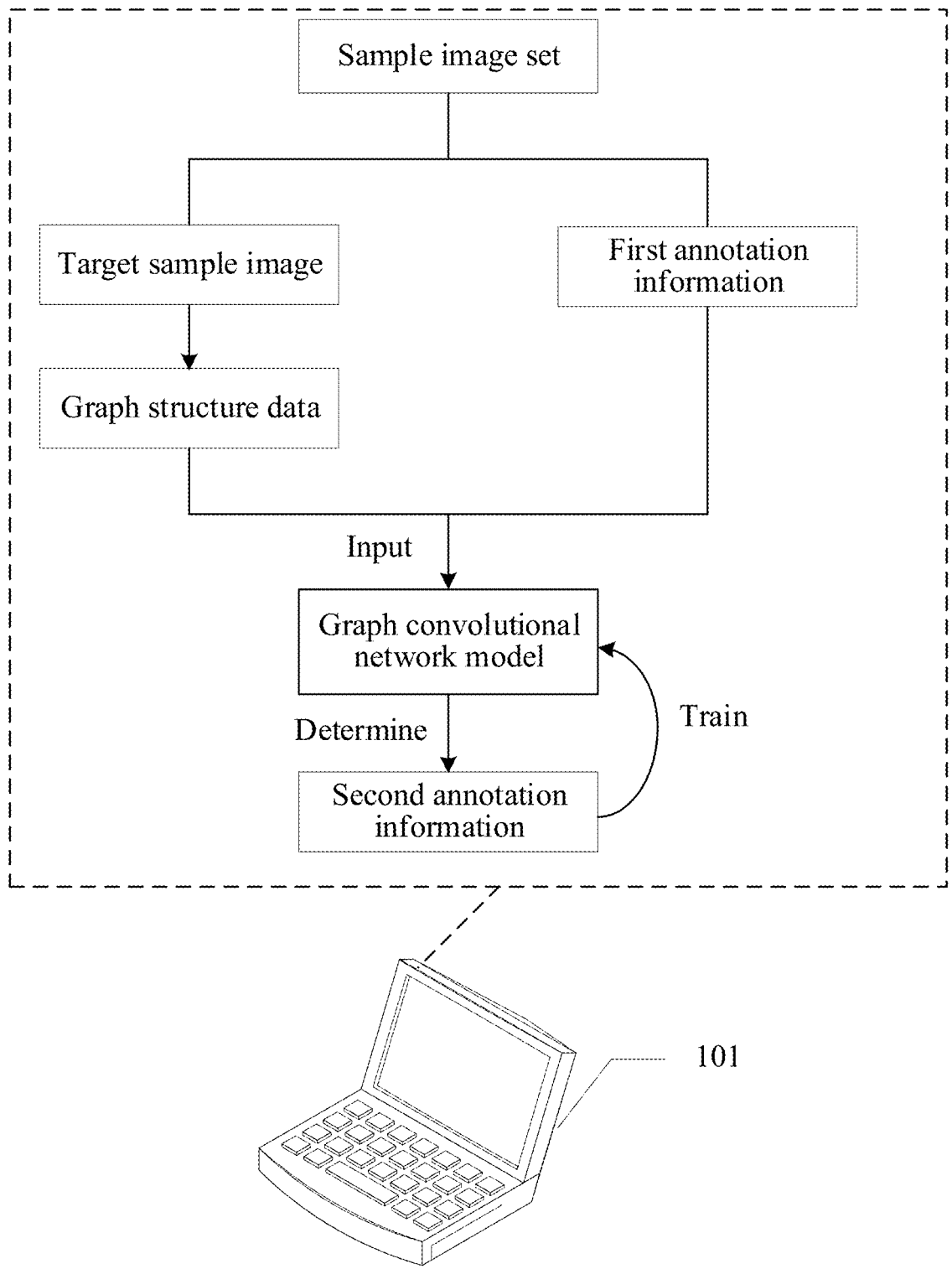
FIG. 1 is a schematic diagram of an application scenario of a training method for an image region segmentation model according to an embodiment of this application.

The following describes embodiments of this application with reference to the accompanying drawings.

Deep learning is now widely used in the field of image segmentation. To train an image region segmentation model, precise pixel-level annotation is often required, but manual pixel-level annotation consumes extremely much time and effort. For example, it usually takes 5 to 30 minutes to manually annotate a lesion in a case picture of 2048*2048. Thus, generating a large quantity of annotated sample images becomes very expensive and time consuming. In view of this, a weakly supervised segmentation method emerges accordingly. For example, the weakly supervised segmentation method may use a class activation mapping (CAM) algorithm.

However, in a weakly supervised segmentation method in a related art, a classification model is generally trained by using an image-level label (which is often an image category) related to a segmentation task, and further, a target region that needs to be segmented, such as a focus in a medical field, is determined by using the trained classification model. Because the image-level label is relatively rough relative to a pixel-level label, it is difficult to accurately annotate the image, and pixel-level intervention is not directly performed. As a result, an image region segmentation result obtained through segmentation by using a model trained by using the weakly supervised method is often inaccurate.

Therefore, embodiments of this application provide a training method for an image region segmentation model. In this method, image-level annotation is still used for a sample image. However, in a model training process, image-level annotation information (first annotation information) is converted into superpixel-level annotation information (second annotation information) based on a graph convolutional network model, and the image region segmentation model is trained by using the second annotation information, thereby implementing relatively strongly supervised model training, improving precision of the trained image region segmentation model, and further improving precision of image segmentation when image region segmentation is performed by using the image region segmentation model.

The training method for an image region segmentation model and an image region segmentation method provided in the embodiments of this application may be applied to a data processing device having a graphics processing unit (GPU). The data processing device may be a terminal device, and the terminal device may be, for example, a computer, a personal digital assistant (PDA), a tablet computer, or a smartphone.

The data processing device may also be a server. In actual deployment, the server may be an independent server, or may be a cluster server or a cloud server. In this case, the server may complete training of the image region segmentation model, then interact with the terminal device, perform target region segmentation on a to-be-segmented image obtained from the terminal device, and return a segmentation result to the terminal device.

To facilitate understanding of the technical solutions of this application, the following describes, with reference to actual application scenarios, the training method for an image region segmentation model provided in the embodiments of this application.

FIG. 1 is a schematic diagram of an application scenario of a training method for an image region segmentation model according to an embodiment of this application. That a data processing device is a terminal device is used as an example, and the application scenario includes a terminal device 101.

The terminal device 101 acquires a sample image set, where the sample image set includes multiple sample images that have first annotation information. The sample image includes a target region of interest of a user, and the sample image may be various types of images, such as a pathological image and a traffic monitoring image. To avoid a large amount of labor and time costs consumed by annotating a sample image, and facilitate implementation of large-scale fast annotation, the first annotation information is annotation information with a relatively large granularity, for example, image-level annotation information.

For a target sample image in the sample image set, graph structure data corresponding to the target sample image is generated, where the graph structure data includes multiple nodes, each node includes at least one pixel in the target sample image, and the target sample image may be any sample image in the sample image set.

The graph structure data includes at least one pixel in the target sample image. The graph structure data formed by these pixels is usually non-standard geometric data. Therefore, the graph structure data needs to be processed by using a graph convolutional network model. That is, in this embodiment, second annotation information of the node in the graph structure data may be determined according to the graph structure data and the first annotation information by using the graph convolutional network model in the image region segmentation model.

The node is actually a superpixel, and includes at least one pixel in the target sample image. That is, the second annotation information is a superpixel-level annotation, and a granularity of the second annotation information is obviously less (or smaller, lower) than the granularity of the first annotation information. In this way, the image region segmentation model including the graph convolutional network model is trained according to the second annotation information, and interference based on the superpixel-level annotation can be strongly supervised, thereby improving precision of the model. In the present disclosure, a granularity of annotation information may refer to the scale or level of details presented in the annotation information relative to the original image. For example, a large granularity of the annotation information may mean that the scale or level of details is large, for example on the whole image level; a small granularity of annotation information may mean that the scale or level of details is smaller, for example on individual pixel level.

In the present disclosure, a superpixel may be different from individual pixels in an image, but also related to individual pixels in the images. Superpixels may be the result of perceptual grouping of pixels, and may include a plurality of individual pixels.

The method provided in this embodiment of this application may be applied to multiple application scenarios, for example, segmentation of a medical image in the medical field to distinguish between tissues of a human body, segmentation of a target region (for example, a lesion) in a pathological picture, and vehicle identification in the traffic field.

Next, the training method for an image region segmentation model provided in this embodiment of this application is described with reference to the accompanying drawings. In various embodiments of the present disclosure, the image region segmentation model may be referred as the image segmentation model.

Figure 2:
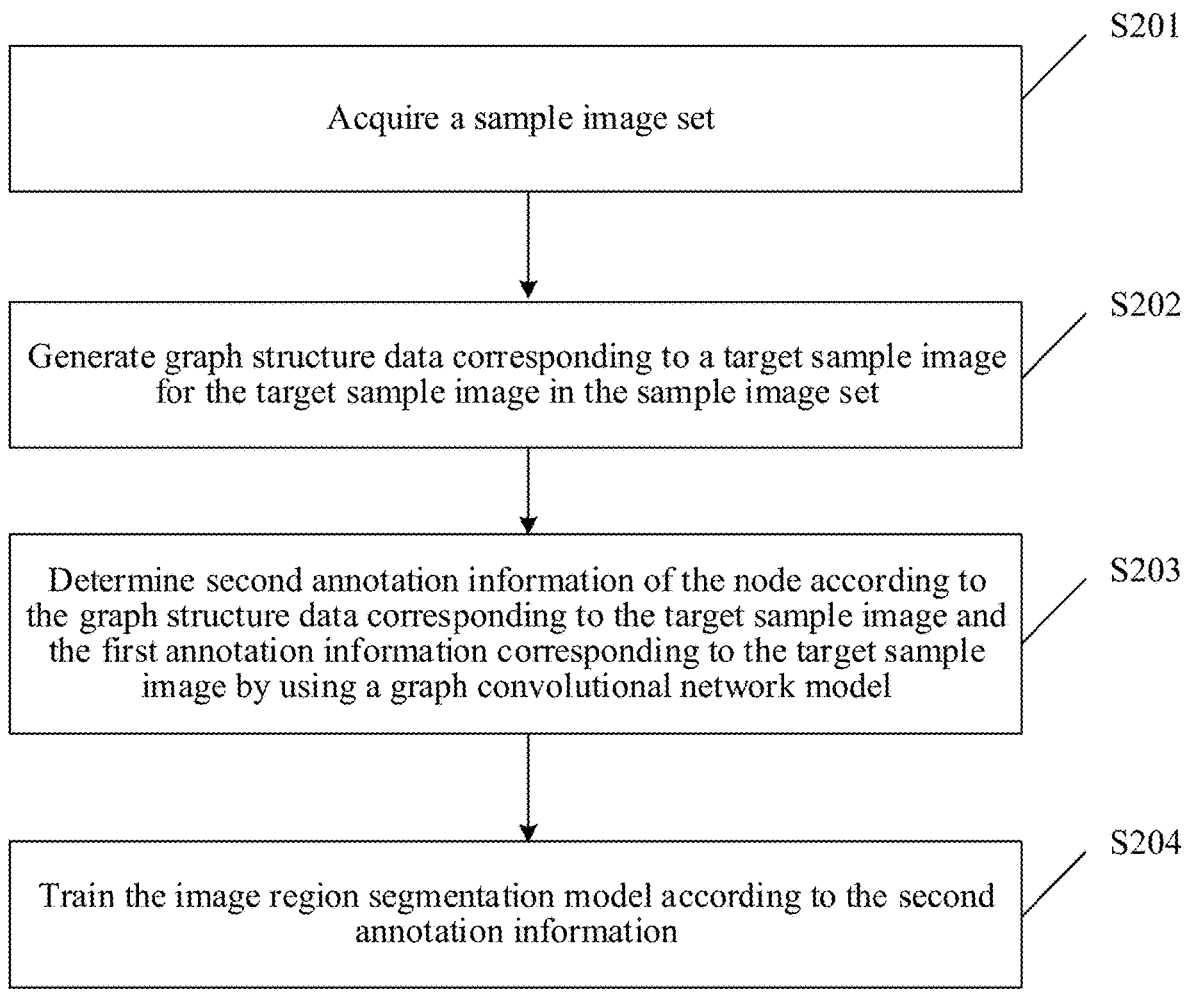
FIG. 2 is a flowchart of a training method for an image region segmentation model according to an embodiment of this application.

FIG. 2 is a flowchart of a training method for an image region segmentation model, where the method includes:

S201. Acquire a sample image set.

The sample image set includes multiple sample images, and each sample image has first annotation information corresponding to the sample image. In this embodiment, the first annotation information is annotation information with a relatively large granularity, for example, image-level annotation information. The image-level annotation information only needs to be annotated for the sample image as a whole, and one sample image is corresponding to one label, and there is no need to annotate each pixel in the sample image. Therefore, labor and time costs of annotation can be reduced, and large-scale fast annotation can be implemented.

The image-level annotation information may include multiple types. In this embodiment, the image-level annotation information may be, for example, an area proportion of a target region in the sample image, that is, the first annotation information includes the area proportion of the target region in the sample image. The target region may be a region that may be of interest to a user in the sample image, such as a lesion in a pathological image. The area proportion of the target region in the sample image may be obtained manually through estimation according to the sample image. To avoid an estimation error, when the area proportion is annotated, an estimation error value may also be annotated, so that the estimation error value is considered in a subsequent model training process, thereby improving precision of model training.

S202. Generate graph structure data corresponding to a target sample image for the target sample image in the sample image set. In various embodiments in the present disclosure, the target sample image may be referred as the sample image.

After the sample image set is obtained, the graph structure data corresponding to the target sample image (the target sample image may be any sample image in the sample image set) is generated. A node of the graph structure data includes at least one pixel in the target sample image, and pixels included in each node may be determined by clustering pixels in the target sample image. Clustering may be based on features of the pixels, that is, pixels with similar features may be clustered together as a node.

In some embodiments, the image region segmentation model may include a fully convolutional network (FCN). A manner of generating the graph structure data may be: performing feature extraction on the target sample image by using the fully convolutional network, to obtain a feature corresponding to each pixel in the target sample image; then, clustering pixels in the target sample image according to features corresponding to the pixels to obtain a superpixel division result; and constructing the graph structure data according to the superpixel division result, where each superpixel in the superpixel division result is used as one node in the graph structure data.

Figure 3:
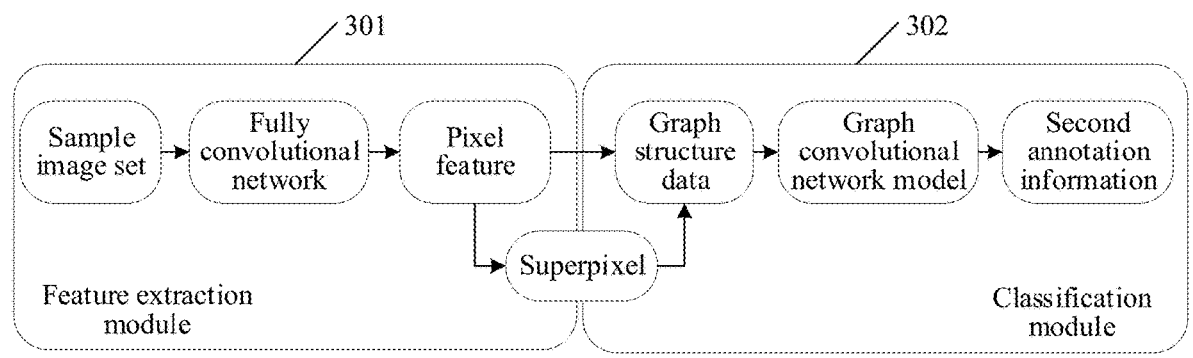
FIG. 3 is a system flowchart of a training method for an image region segmentation model according to an embodiment of this application.

For the manner of generating the graph structure data, reference may be made to FIG. 3. FIG. 3 shows a system procedure of a training method for an image region segmentation model, which mainly includes a feature extraction module 301 and a classification module 302. The feature extraction module 301 is configured to input a target sample image in a sample image set into a fully convolutional network, to obtain a feature of each pixel in the target sample image. The feature corresponding to each pixel may be represented by using an N-dimensional feature vector, and N is a quantity of channels of the fully convolutional network.

In this embodiment of this application, a conventional fully convolutional network may be selected. For example, U-Net, where U-Net is a network structure of the fully convolutional network, and certainly, another network structure may be selected. This embodiment sets no limitation on a network structure of the fully convolutional network.

Because a corresponding feature of each pixel is obtained, the pixels in the target sample image may be clustered according to features of the pixels, and pixels with similar features are clustered together to form a superpixel, to obtain a superpixel division result. For example, features of pixels belonging to the same cell are generally similar, and the pixels may be clustered together to form one superpixel. Features of pixels that belong to the same part (for example, all belong to the mouth) are generally similar, and the pixels may be clustered together to form one superpixel, and the like.

A quantity of superpixels needs to be specified for superpixel division. In this embodiment of this application, a random number is used for assigning a value. There may be multiple clustering methods, such as simple linear iterative clustering (SLIC), a normalized segmentation algorithm, and a gradient ascend-based algorithm. This is not limited in this embodiment of this application. In some implementation, depending on the complexity of the image, a number of superpixels may vary from 20 to 10,000, and the more complex the image is, the higher number of superpixels.

In this embodiment, the fully convolutional network is used for extracting a feature of a pixel, and superpixel division needs to use a feature of a pixel outputted by the fully convolutional network as a basis for division. Therefore, as long as the feature changes, superpixel division also correspondingly changes. In a training process of the image region segmentation model, parameter adjustment is performed on the fully convolutional network in the image region segmentation model, thereby causing a change to an outputted feature, and further driving a change of a superpixel division result. That is, in this embodiment, a dynamic superpixel is obtained, and such a dynamic superpixel helps improve precision of model training.

After the superpixel division result is obtained, the graph structure data may be constructed according to the superpixel division result, and each superpixel in the superpixel division result is used as one node in the graph structure data to enter the subsequent classification module 302.

In addition to including multiple nodes in the graph structure data, there may also be edges and weights of the edges between some nodes. An edge indicates that two nodes are spatially adjacent to each other and have an association relationship. A weight of an edge represents a degree of association between two nodes, and a larger weight indicates a greater degree of association.

Therefore, in some embodiments, a manner of constructing the graph structure data according to the superpixel division result may be determining an edge between nodes according to location information of pixels included in any two nodes. Generally, if two superpixels (nodes) are spatially connected, an edge connection may be established between the two superpixels. A manner of determining whether two superpixels (nodes) are spatially connected may be determining whether adjacent pixels exist in pixels included in the two superpixels. In some implementations, the graph structure data may include: information of the superpixels (or nodes), and/or information of the association relationship (or edges) between the superpixels, and/or information of degree (or weight) of association between superpixels.

For any edge, if the edge is connected to a first node and a second node, a weight of the edge is determined according to a Euclidean distance between features corresponding to the first node and the second node. A larger European distance indicates a smaller degree of association and a smaller weight. Setting the weight in this manner can more accurately reflect a degree of association between superpixels, thereby improving accuracy of subsequent processing.

Certainly, a manner of determining the weight of the edge may be further simplified. In some cases, weights of all edges may be set to a uniform value, for example, the weights of the edges may be uniformly set to 1.

It may be understood that, for each node in the graph structure data, a feature corresponding to the node is an average value of features of pixels included in the node. If the feature of the pixel is an N-dimensional feature vector, the feature of the node is also an N-dimensional feature vector.

S203. Determine second annotation information of the node according to the graph structure data corresponding to the target sample image and the first annotation information corresponding to the target sample image by using a graph convolutional network model.

After the graph structure data is obtained, that is, after data required for the graph convolutional network model is obtained, and the graph structure data may be inputted to the graph convolutional network model, so as to train the image region segmentation model including the graph convolutional network model. The graph convolutional network model may include five linear graph convolutional layers, and quantities of neurons in the linear layers are 64, 128, 256, 64, and 1. A non-linear active layer (ReLu) is added to each layer except the last layer.

Referring to 302 in FIG. 3, the graph convolutional network model may determine second annotation information of the node according to the graph structure data and the first annotation information. Because the graph structure data includes multiple nodes and a node includes at least one pixel, the second annotation information is pixel-level annotation information, and a granularity of the second annotation information is less (or smaller, lower) than a granularity of the first annotation information.

S204. Train the image region segmentation model according to the second annotation information.

In this embodiment, the first annotation information is a pre-annotated real label, and the second annotation information is a pseudo-label, and is pixel-level annotation information that is obtained by predicting the graph structure data and that is converted according to the first annotation information by using the graph convolutional network model included in the image region segmentation model. Compared with the first annotation information, the second annotation information can provide a relatively strongly supervised signal. Therefore, the image region segmentation model may be trained according to the second annotation information.

For one example in an embodiment, but not limited to, the fully convolutional network uses U-Net, a dimension N of a feature may be set to 24, a quantity of superpixels is not fixed, and a random number between 200-8000 is used for each iteration. An adaptive moment estimation (Adam) optimization method may be used, and a learning rate is set to 0.001.

For one example, 305 sample images may be acquired, and the sample images may be pathological images, for example, HER2 images. HER2 is also referred to as a proto-oncogene human epidermal growth factor receptor 2 (HER2), and is used for detecting breast cancer. These sample images come from 50 full scanning slides and are used for training the image region segmentation model. 226 pieces of sample data are used for model training, and the other 79 pieces of sample images are used as test data. Training data is used for training the image region segmentation model based on the method provided in this embodiment of this application, and the test data is used for testing the image region segmentation model to obtain a DICE coefficient 0.84 (the DICE coefficient is a similarity measurement function, and is generally used for calculating similarity between two samples) of a segmentation result. However, when the image region segmentation model is trained by using a supervised algorithm (fully supervised based on U-Net), an obtained DICE coefficient is 0.86. It can be learned that the training method for an image region segmentation model provided in this embodiment of this application has approximated a supervised algorithm, which proves validity and feasibility of the algorithm.

It can be learned from the foregoing technical solutions that, in this application, in a model training process, a sample image set is acquired, where the sample image set includes at least one sample image, the sample image has first annotation information corresponding to the sample image, and the first annotation information may be annotation information with a relatively large granularity such as an image level, so that large-scale fast annotation is easily implemented. For a target sample image in the sample image set (which may be any sample image in the sample image set), graph structure data corresponding to the target sample image is generated, where the graph structure data includes multiple nodes, and each node includes at least one pixel in the target sample image. Second annotation information of the node is determined according to the graph structure data corresponding to the target sample image and first annotation information corresponding to the target sample image by using a graph convolutional network model, where a granularity of the second annotation information is less than a granularity of the first annotation information. The node is actually a superpixel, and includes at least one pixel. That is, the second annotation information is a superpixel-level annotation. In this way, an image region segmentation model including a graph convolutional network model is trained according to the second annotation information, and interference based on the pixel-level annotation can be strongly supervised, thereby improving precision of the model. It can be learned that, in this application, on the premise of implementing large-scale fast annotation, image-level annotation information is converted into superpixel-level annotation information based on the graph convolutional network model, thereby implementing relatively strongly supervised model training, improving precision of the image region segmentation model, and improving precision of image segmentation when image region segmentation is performed by using the image region segmentation model.

In a possible implementation, the first annotation information may include an area proportion of the target region in the sample image. If pixel distribution in the sample image and the graph structure data is uniform, the area proportion may also reflect a proportion of a quantity of nodes in the graph structure data that belong to the target region in all the node data. If the quantity of nodes that belong to the target region is determined, it may be determined which nodes belong to the target region and which nodes belong to a background region, so as to determine the second annotation information of the node.

Therefore, a possible implementation of determining the second annotation information may be: obtaining a prediction result of each node according to the graph structure data by using the graph convolutional network model. A first node quantity corresponding to the target region (that is, the quantity of nodes that belong to the target region) and a second node quantity corresponding to the background region (that is, the quantity of nodes that belong to the background region) are determined according to the area proportion and the total quantity of nodes in the graph structure data. The background region is a region in the image sample except the target region, and the target region may also be referred to as a foreground region. Then, the second annotation information of the node is determined according to the first node quantity, the second node quantity, and the prediction result.

Generally, the prediction result is a probability value, obtained by the graph convolutional network model through prediction according to the graph structure data, that each node belongs to the target region, and a higher probability value corresponding to a node indicates that the node is more likely to belong to the target region. After the prediction result is obtained, sorting may be performed according to sizes of probability values, for example, sorting is performed in descending order of probability values, or sorting is performed in descending order of probability values. Because the node data that belongs to the target region is the first node quantity, second annotation information of only nodes of the first node quantity indicates that the nodes belong to the target region (for example, the second annotation information is set to 1), and second annotation information of nodes of the remaining second node quantity indicates that the nodes belong to the background region (for example, the second annotation information is set to 0). Because a higher probability value indicates that a node is more likely to belong to the target region, if the prediction results are sorted in descending order of probability values, the second annotation information of the nodes of the first node quantity in forward positions of the prediction results may be selected from all the nodes to indicate that the nodes belong to the target region (for example, the second annotation information is set to 1), and the second annotation information of the nodes of the remaining second node quantity indicates that the nodes belong to the background region (for example, the second annotation information is set to 0).

In various embodiments, for example, if the area proportion is p, and the total quantity of nodes is M, the quantity of nodes (the first node quantity) corresponding to the target region is $p \times M$, and the quantity of nodes (the second node quantity) corresponding to the background region is $(1-p) \times M$. In view of this, if the prediction results are sorted in descending order of probability values, second annotation information of the first $p \times M$ nodes in the prediction results may be set to 1, and second annotation information of the rest $(1-p) \times M$ nodes is set to 0.

In some embodiments, to avoid an estimation error, when the area proportion is annotated, an estimation error value may be further annotated, that is, the first annotation information further includes the estimation error value. In this case, a manner of determining the first node quantity and the second node quantity also changes. When the first node quantity and the second node quantity are determined, not only the area proportion but also the estimation error value needs to be considered. That is, the first node quantity and the second node quantity may be determined according to the area proportion, the estimation error value, and the total quantity of nodes in the graph structure data.

In various embodiments, for example, if the area proportion is p, and the total quantity of nodes is M, the estimated first node quantity is $p \times M$, and the estimated second node quantity is $(1-p) \times M$. If the estimation error value is q, considering the estimation error value, the first node quantity that is convinced is $(p-q) \times M$, and the second node quantity that is convinced is $(1-p-g) \times M$.

In some implementations, when the area proportion is p, the total quantity of nodes is M, and the estimation error value is q: the ascertained number of first nodes is (p−q)×M, and/or the ascertained number of second nodes is (1−p−q)×M. Here in various embodiments in the present disclosure, the first node(s) may refer to the node(s) that belong to the target region (i.e., located inside the target region); and/or the second node(s) may refer to the node(s) that do not belong to the target region (i.e., located outside the target region).

In view of this, if the prediction results are sorted in descending order of probability values, second annotation information of the first (p−q)×M nodes in the prediction results may be set to 1, and second annotation information of the rest (1−p−q)×M nodes after the first (p−q)×M nodes is set to 0. However, remaining unconvinced nodes may be ignored and not annotated, so as to avoid imprecise model training due to an estimation error.

In a process of training the image region segmentation model according to the second annotation information, the second annotation information may be used as a supervised signal, for example, a loss function may be constructed according to a prediction result of each node and the second annotation information, so that the image region segmentation model is trained according to the loss function. The training process may include training the graph convolutional network model and the fully convolutional network in the image region segmentation model until a value of the loss function is minimum, and stopping training.

The construction of the loss function may include multiple manners, for example, the loss function may be constructed in a manner of mutual information entropy, mean squared error (MSE), and applying of a strongly supervised signal.

Figure 4:
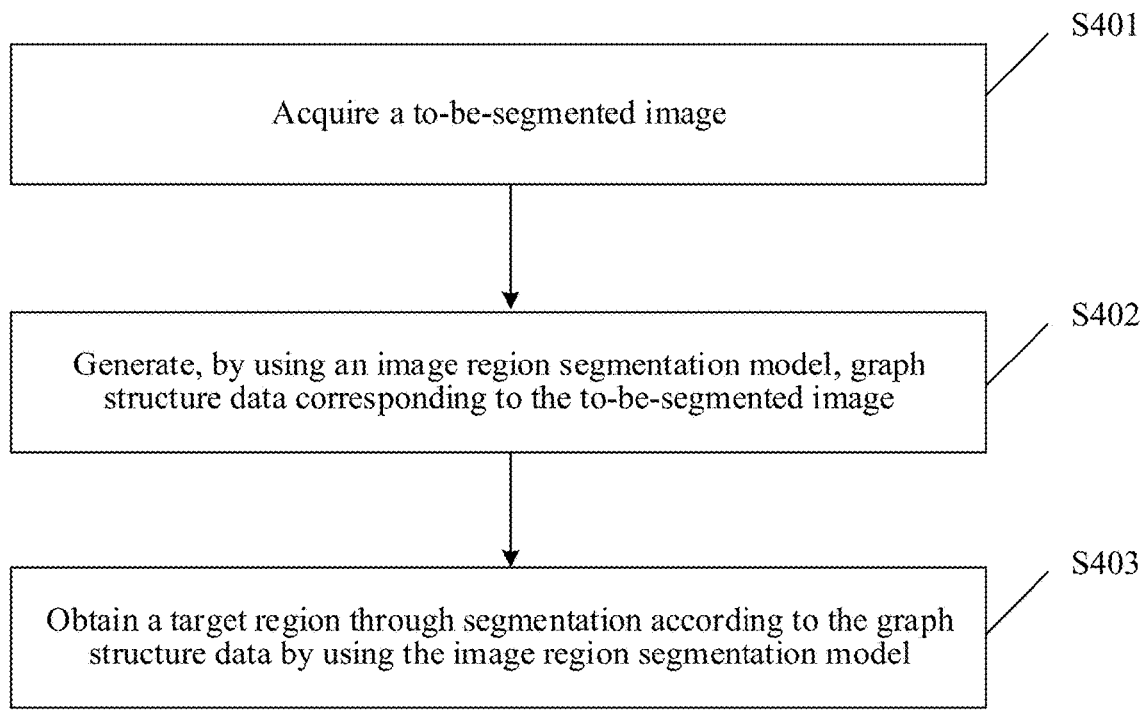
FIG. 4 is a flowchart of an image region segmentation method according to an embodiment of this application.

Based on the training method for an image region segmentation model provided in the foregoing embodiment, an embodiment of this application further provides an image region segmentation method. Referring to FIG. 4, the method includes the following steps:

S401. Acquire a to-be-segmented image.

The to-be-segmented image may be various types of images, such as a pathological image and a traffic monitoring image. That the to-be-segmented image is a pathological image is used as an example, a target region to be obtained by performing image region segmentation may be a lesion to be used for subsequent diagnosis. For the to-be-segmented image, refer to 501 in FIG. 5.

S402. Generate, by using an image region segmentation model, graph structure data corresponding to the to-be-segmented image.

Figure 5:
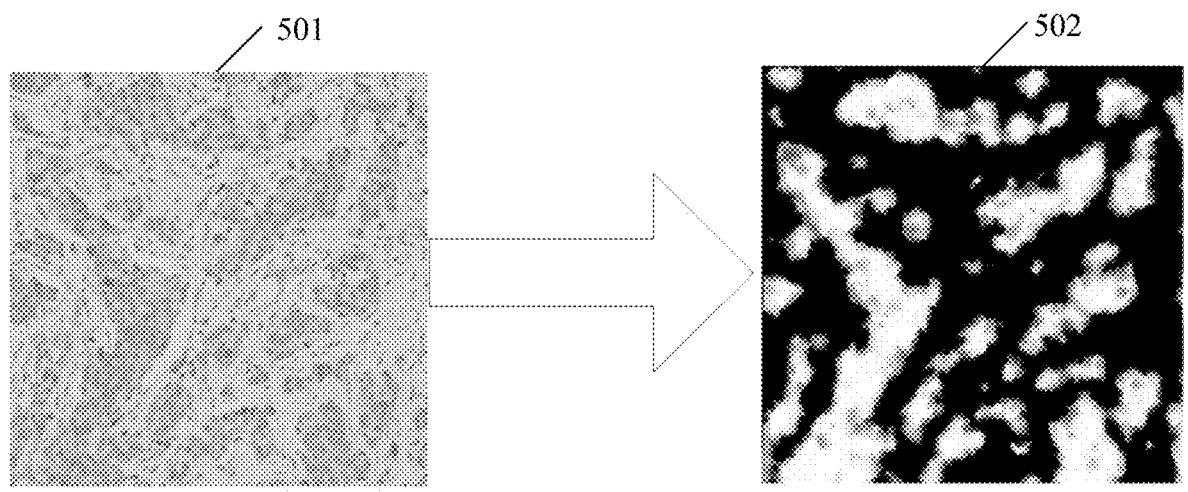
FIG. 5 is a system flowchart of an image region segmentation method according to an embodiment of this application.

The to-be-segmented image is inputted into the image region segmentation model (as shown in FIG. 5) to obtain the graph structure data corresponding to the to-be-segmented image. The graph structure data includes multiple nodes, and each node includes at least one pixel in the to-be-segmented image.

The image region segmentation model used in this embodiment of this application is trained according to the method provided in the embodiment shown in FIG. 2, and details are not described herein again.

S403. Obtain a target region through segmentation according to the graph structure data corresponding to the to-be-segmented image by using the image region segmentation model.

The graph structure data is predicted by using the image region segmentation model to obtain a prediction result, so as to determine which nodes in the graph structure data belong to the target region and which nodes belong to a background region, and further determine which pixels in the to-be-segmented image belong to the target region and which pixels belong to the background region, so as to obtain the target region through segmentation. For a segmentation effect diagram, refer to 502 in FIG. 5, where white represents the target region and black represents the background region.

Figure 6A:
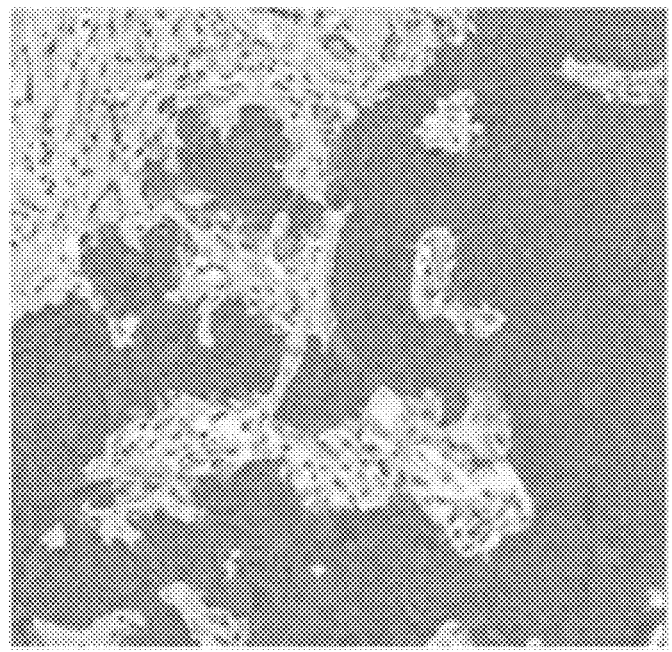
FIG. 6A is a diagram of a segmentation effect obtained by performing segmentation by using an image region segmentation method according to an embodiment of this application.
Figure 6B:
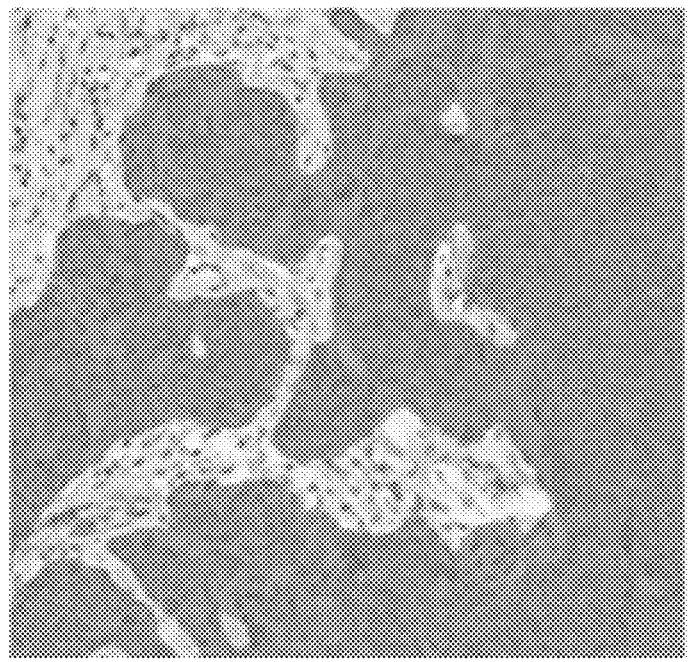
FIG. 6B is a diagram of a segmentation effect obtained by performing segmentation by using a supervised algorithm.

For a comparison diagram between a segmentation effect obtained by performing image segmentation by using the image region segmentation method provided in this embodiment of this application and a segmentation effect obtained by performing image segmentation by using a supervised algorithm, refer to FIG. 6A and FIG. 6B. The picture in FIG. 6A is a segmentation effect diagram obtained by performing segmentation by using the image region segmentation method provided in this embodiment of this application. The picture in FIG. 6B is a segmentation effect diagram obtained by performing segmentation by using a supervised algorithm. It can be learned through comparison that segmentation results of the two effect diagrams are similar to each other. It may be learned that the image region segmentation method provided in this embodiment of this application can be used for implementing relatively strong supervision to improve precision of the model.

Figure 7:
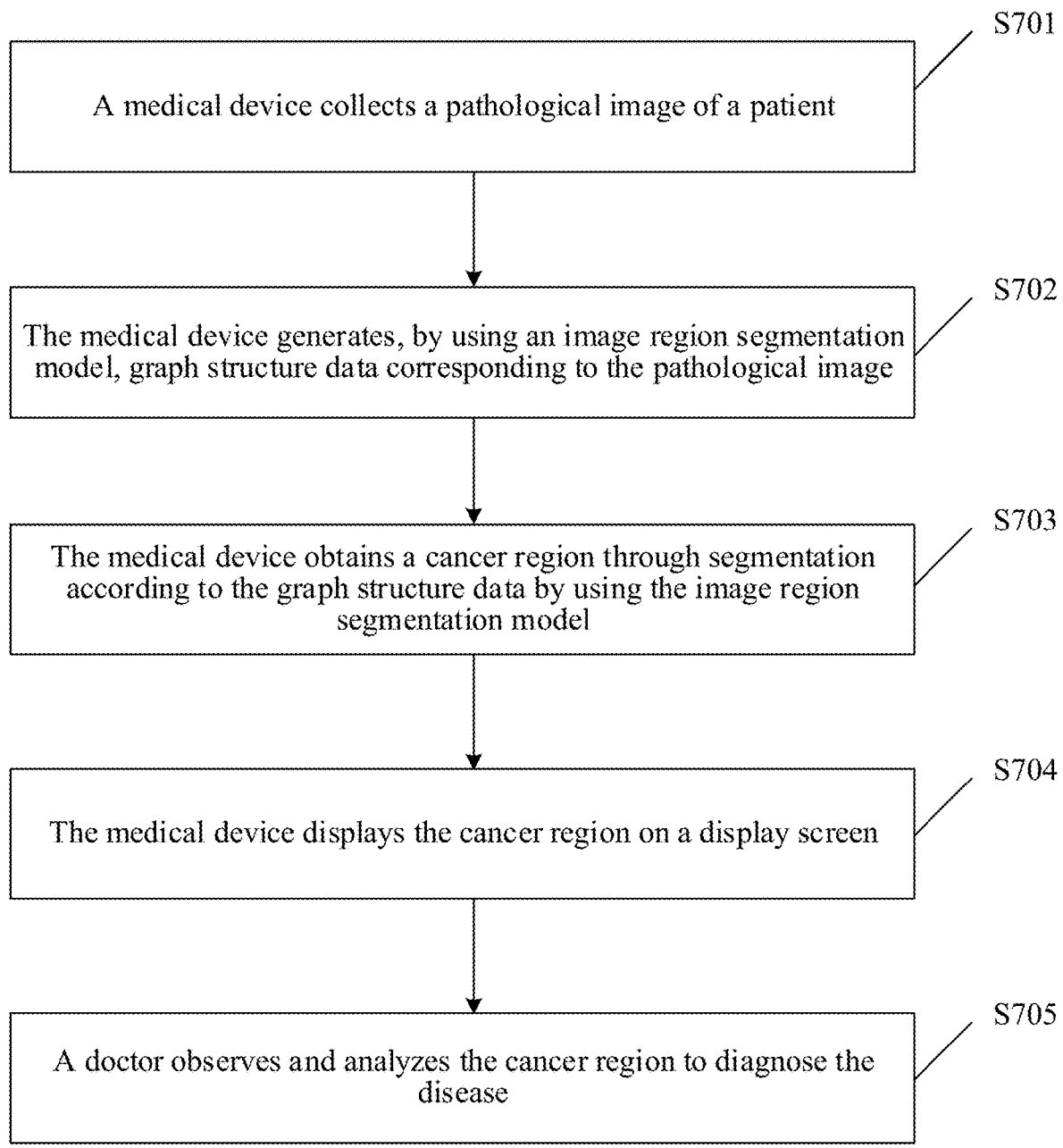
FIG. 7 is a flowchart of an image region segmentation method according to an embodiment of this application.

Next, the image region segmentation method provided in the embodiment of this application is described with reference to an actual application scenario. A medical scenario is used as an example. In this application scenario, a medical device carries a pre-trained image region segmentation model. The medical device may collect a pathological image of a patient, and perform lesion segmentation on the pathological image. Referring to FIG. 7, the method includes the following steps:

S701. The medical device collects a pathological image of a patient.

S702. The medical device generates, by using an image region segmentation model, graph structure data corresponding to the pathological image.

S703. The medical device obtains a lesion through segmentation according to the graph structure data by using the image region segmentation model.

S704. The medical device displays the lesion on a display screen.

S705. A doctor observes and analyzes the lesion to diagnose the disease.

The training method for an image region segmentation model and the image region segmentation method provided in the embodiments of this application may be applied to multiple scenarios. Using a medical field as an example, the training method for an image region segmentation model and the image region segmentation method may be applied to a medical device. The medical device may train the image region segmentation model by using the training method for an image region segmentation model, and further perform region segmentation on a pathological image by using the trained image region segmentation model, to obtain a target region such as a lesion, so as to be used for subsequent analysis and processing.

Therefore, an embodiment of this application further provides a medical device. The medical device may be a medical image device, such as an X-ray machine, a computed tomography (CT) device, or a magnetic resonance imaging (MRI) device. The medical device includes an image collection module, an image processing module, and an image display module;

the image collection module is configured to acquire a to-be-segmented image; the to-be-segmented image being a pathological image that includes a biological tissue;

the image processing module is configured to generate, by using an image region segmentation model, graph structure data corresponding to the to-be-segmented image; the graph structure data including multiple nodes, and each node including at least one pixel in the to-be-segmented image; the image region segmentation model being obtained through training according to second annotation information, and the second annotation information being determined according to graph structure data corresponding to a sample image and first annotation information corresponding to the sample image; and a granularity of the second annotation information being less than a granularity of the first annotation information; and obtain a lesion in the to-be-segmented image through segmentation according to the graph structure data by using the image region segmentation model; and the image display module is configured to display the lesion, so that a doctor can observe and analyze the lesion displayed by the medical device.

In a possible implementation, the image collection module is configured to acquire a sample image set, the sample image set including multiple sample images, and the sample image having first annotation information corresponding to the sample image;

the image processing module is configured to:

generate graph structure data corresponding to a target sample image for the target sample image in the sample image set; the graph structure data including multiple nodes, and each node including at least one pixel in the target sample image; and the target sample image being any sample image in the sample image set;

determine second annotation information of the node according to the graph structure data corresponding to the target sample image and the first annotation information corresponding to the target sample image by using a graph convolutional network model; a granularity of the second annotation information being less than a granularity of the first annotation information; and the graph convolutional network model being a part of the image region segmentation model; and train the image region segmentation model according to the second annotation information.

In a possible implementation, the first annotation information includes an area proportion of a target region in a sample image, and the image processing module is configured to:

obtain a prediction result of each node according to the graph structure data by using the graph convolutional network model;

determine, according to the area proportion and a total quantity of nodes in the graph structure data, a first node quantity corresponding to the target region and a second node quantity corresponding to a background region, the background region being a region in the sample image except the target region; and determine the second annotation information of the node according to the first node quantity, the second node quantity, and the prediction result.

In a possible implementation, the first annotation information further includes an estimation error value, and the image processing module is configured to:

determine, according to the area proportion, the estimation error value, and a total quantity of nodes in the graph structure data, a first node quantity corresponding to the target region and a second node quantity corresponding to a background region.

In a possible implementation, the image processing module is configured to:

construct a loss function according to the prediction result of each node and the second annotation information; and train the image region segmentation model according to the loss function.

In a possible implementation, the image region segmentation model includes a fully convolutional network, and the image processing module is configured to:

perform feature extraction on the target sample image by using the fully convolutional network, to obtain a feature corresponding to each pixel in the target sample image;

cluster the pixels in the target sample image according to features corresponding to the pixels to obtain a superpixel division result; and construct the graph structure data according to the superpixel division result, each superpixel in the superpixel division result being used as one node in the graph structure data.

In a possible implementation, the image processing module is configured to:

determine an edge between a first node and a second node according to location information of pixels respectively included in the first node and the second node; where the first node and the second node may be any two nodes; and determine a weight of the edge according to a Euclidean distance between features respectively corresponding to the first node and the second node.

In a possible implementation, for each node in the graph structure data, a feature corresponding to the node is an average value of features of pixels included in the node.

Figure 8:
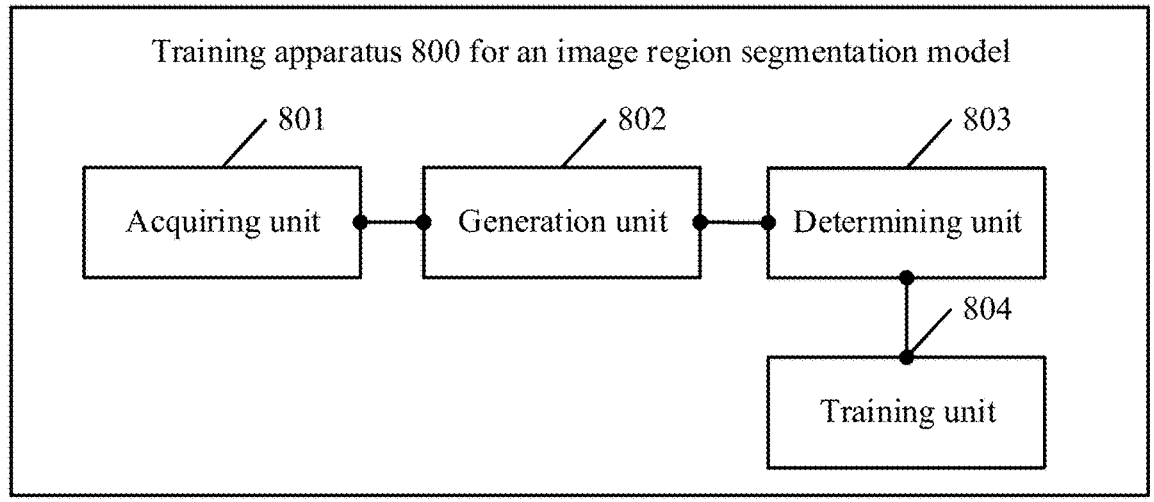
FIG. 8 is a structural diagram of a training apparatus for an image region segmentation model according to an embodiment of this application.

Based on the foregoing embodiment corresponding to FIG. 2, an embodiment of this application further provides a training apparatus for an image region segmentation model. Referring to FIG. 8, the apparatus includes an acquiring unit 801, a generation unit 802, a determining unit 803, and a training unit 804.

The acquiring unit 801 is configured to acquire a sample image set, the sample image set including at least one sample image, and each sample image having first annotation information corresponding to the sample image;

the generation unit 802 is configured to generate graph structure data corresponding to a target sample image for the target sample image in the sample image set; the graph structure data including multiple nodes, and each node including at least one pixel in the target sample image; and the target sample image being any sample image in the sample image set;

the determining unit 803 is configured to determine second annotation information of the node according to the graph structure data corresponding to the target sample image and the first annotation information corresponding to the target sample image by using a graph convolutional network model; a granularity of the second annotation information being less than a granularity of the first annotation information; and the graph convolutional network model being a part of the image region segmentation model; and the training unit 804 is configured to train the image region segmentation model according to the second annotation information.

In a possible implementation, the first annotation information includes an area proportion of a target region in a sample image, and the determining unit 803 is configured to:

obtain a prediction result of each node according to the graph structure data by using the graph convolutional network model;

determine, according to the area proportion and a total quantity of nodes in the graph structure data, a first node quantity corresponding to the target region and a second node quantity corresponding to a background region, the background region being a region in the sample image except the target region; and determine the second annotation information of the node according to the first node quantity, the second node quantity, and the prediction result.

In a possible implementation, the first annotation information further includes an estimation error value, and the determining unit 803 is configured to:

determine, according to the area proportion, the estimation error value, and a total quantity of nodes in the graph structure data, a first node quantity corresponding to the target region and a second node quantity corresponding to a background region.

In a possible implementation, the training unit 804 is configured to:

construct a loss function according to the prediction result of each node and the second annotation information; and train the image region segmentation model according to the loss function.

In a possible implementation, the image region segmentation model includes a fully convolutional network, and the generation unit 802 is configured to:

perform feature extraction on the target sample image by using the fully convolutional network, to obtain a feature corresponding to each pixel in the target sample image;

cluster the pixels in the target sample image according to features corresponding to the pixels to obtain a superpixel division result; and construct the graph structure data according to the superpixel division result, each superpixel in the superpixel division result being used as one node in the graph structure data.

In a possible implementation, the generation unit 802 is configured to:

determine an edge between a first node and a second node according to location information of pixels respectively included in the first node and the second node; the first node and the second node being any two nodes; and determine a weight of the edge according to a Euclidean distance between features respectively corresponding to the first node and the second node.

In a possible implementation, for each node in the graph structure data, a feature corresponding to the node is an average value of features of pixels included in the node.

Figure 9:
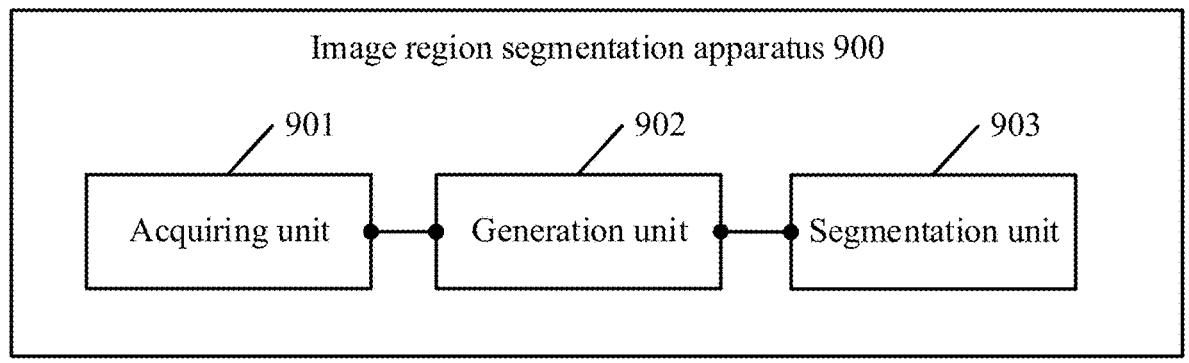
FIG. 9 is a structural diagram of an image region segmentation apparatus according to an embodiment of this application.

Based on the foregoing embodiment corresponding to FIG. 4, an embodiment of this application further provides an image region segmentation apparatus based on artificial intelligence. Referring to FIG. 9, the apparatus includes an acquiring unit 901, a generation unit 902, and a segmentation unit 903.

The acquiring unit 901 is configured to acquire a to-be-segmented image;

the generation unit 902 is configured to generate, by using an image region segmentation model, graph structure data corresponding to the to-be-segmented image; the graph structure data including multiple nodes, and each node including at least one pixel in the to-be-segmented image; the image region segmentation model being obtained through training according to second annotation information, and the second annotation information being determined according to graph structure data corresponding to a sample image and first annotation information corresponding to the sample image; and a granularity of the second annotation information being less than a granularity of the first annotation information; and the segmentation unit 903 is configured to obtain a target region in the to-be-segmented image through segmentation according to the graph structure data corresponding to the to-be-segmented image by using the image region segmentation model.

In a possible implementation, the to-be-segmented image is a pathological image, and the target region is a lesion.

Figure 10:
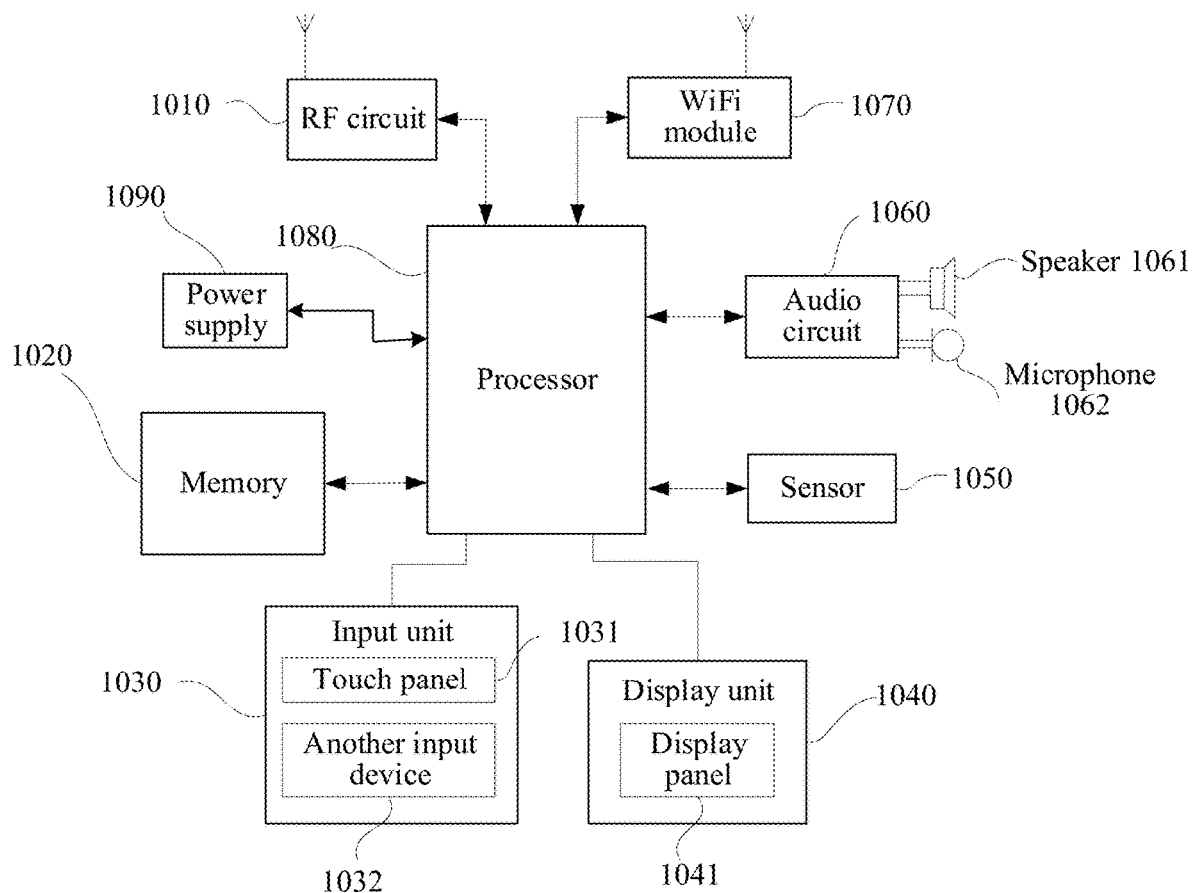
FIG. 10 is a structural diagram of a terminal device according to an embodiment of this application.

An embodiment of this application further provides a device, and the device may implement the foregoing training method for an image region segmentation model or image region segmentation method. The device is described below with reference to the accompanying drawings. Referring to FIG. 10, an embodiment of this application provides a device 1000, and the device 1000 may alternatively be a terminal device. The terminal device may include a computer, a tablet computer, a mobile phone, a personal digital assistant (PDA), a point of sales (POS), or an in-vehicle computer, and the terminal device being a mobile phone is used as an example.

FIG. 10 is a block diagram of a structure of a part of a mobile phone related to a terminal device according to an embodiment of this application. Referring to FIG. 10, the mobile phone includes components such as: a radio frequency (RF) circuit 1010, a memory 1020, an input unit 1030, a display unit 1040, a sensor 1050, an audio circuit 1060, a wireless fidelity (Wi-Fi) module 1070, a processor 1080, and a power supply 1090. A person skilled in the art can understand that the structure of the mobile phone shown in FIG. 10 does not constitute a limitation to the mobile phone, and the mobile phone may include more components or fewer components than those shown in the figure, or some components may be combined, or a different component deployment may be used.

In this embodiment, the processor 1080 included in the terminal further has the following functions:

acquiring a sample image set, the sample image set including multiple sample images, and each sample image having first annotation information corresponding to the sample image;

generating graph structure data corresponding to a target sample image for the target sample image in the sample image set; the graph structure data including multiple nodes, and each node including at least one pixel in the target sample image; and the target sample image being any sample image in the sample image set;

determining second annotation information of the node according to the graph structure data corresponding to the target sample image and the first annotation information corresponding to the target sample image by using a graph convolutional network model; a granularity of the second annotation information being less than a granularity of the first annotation information; and the graph convolutional network model being a part of the image region segmentation model; and training the image region segmentation model according to the second annotation information; or acquiring a to-be-segmented image;

generating, by using an image region segmentation model, graph structure data corresponding to the to-be-segmented image; the graph structure data including multiple nodes, and each node including at least one pixel in the to-be-segmented image; the image region segmentation model being obtained through training according to second annotation information, and the second annotation information being determined according to graph structure data corresponding to a sample image and first annotation information corresponding to the sample image; and a granularity of the second annotation information being less than a granularity of the first annotation information; and obtaining a target region in the to-be-segmented image through segmentation according to the graph structure data corresponding to the to-be-segmented image by using the image region segmentation model.

Figure 11:
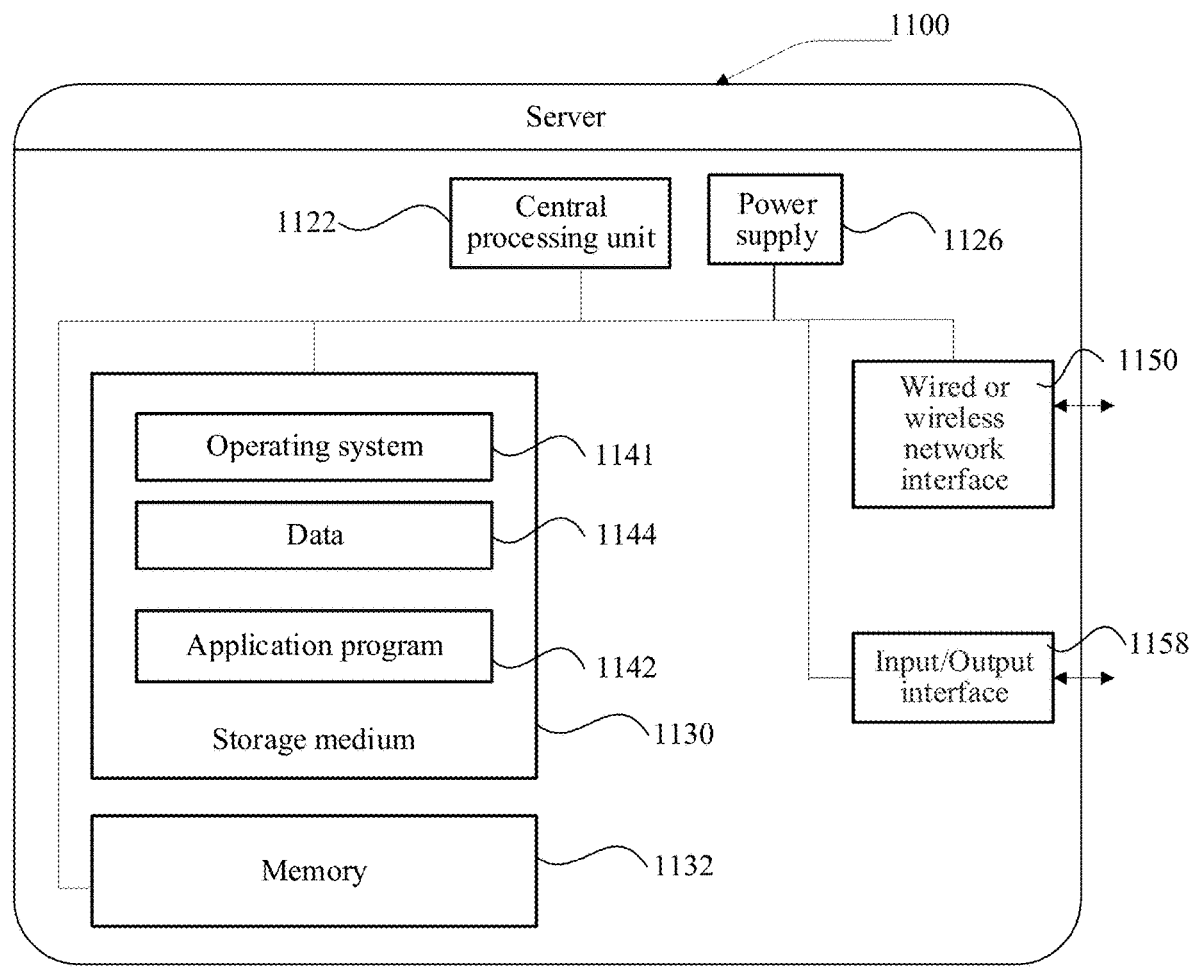
FIG. 11 is a structural diagram of a server according to an embodiment of this application.

An embodiment of this application further provides a server. FIG. 11 is a structural diagram of a server 1100 according to an embodiment of this application. The server 1100 may vary greatly due to different configurations or performance, and may include one or more central processing units (CPUs) 1122 (for example, one or more processors) and a memory 1132, and one or more storage media 1130 (for example, one or more mass storage devices) that store application programs 1142 or data 1144. The memory 1132 and the storage medium 1130 may be transient or persistent storage. The program stored in the storage medium 1130 may include one or more modules (not shown in the figure), and each module may include a series of instructions and operations for the server. Still further, the CPU 1122 may be configured to communicate with the storage medium 1130, and perform, on the server 1100, the series of instruction operations in the storage medium 1130.

The server 1100 may further include one or more power supplies 1126, one or more wired or wireless network interfaces 1150, one or more input/output interfaces 1158, and/or one or more operating systems 1141, for example, Windows Server™, Mac OS X™, Unix™, Linux™, or FreeBSD™.

The step that is in the foregoing embodiment and that is performed by the server may be based on a server structure shown in FIG. 11.

In various embodiments in the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

An embodiment of this application further provides a computer-readable storage medium, configured to store a program code, the program code being used for performing the method according to the foregoing embodiments.

An embodiment of this application further provides a computer program product including instructions, the instructions, when being run on a computer, causing the computer to perform the method according to the foregoing embodiments.

The foregoing embodiments are merely intended for describing the technical solutions of this application, but not for limiting this application; It should be understood by a person of ordinary skill in the art that although this application has been described in detail with reference to the foregoing embodiments, modifications can be made to the technical solutions described in the foregoing embodiments, or equivalent replacements can be made to some technical features in the technical solutions; without departing from the spirit and scope of the technical solutions of the embodiments of this application.

What is claimed is:

1. A method for training an image segmentation model, the method comprising:

acquiring, by a device comprising a memory storing instructions and a processor in communication with the memory, a sample image set, each image of the sample image set having first annotation information, the first annotation information comprising an area proportion of a target region in the sample image;

generating, by the device, graph structure data corresponding to a sample image in the sample image set, the graph structure data comprising multiple nodes, and each node comprising at least one pixel in the sample image;

determining, by the device, second annotation information of each node according to the graph structure data and the first annotation information corresponding to the sample image by using a graph convolutional network model, a granularity of the second annotation information being smaller than a granularity of the first annotation information, the graph convolutional network model being a part of an image segmentation model, by:

obtaining a prediction result of each node according to the graph structure data by using the graph convolutional network model, determining, according to the area proportion and a total quantity of nodes in the graph structure data, a first node quantity corresponding to the target region and a second node quantity corresponding to a background region, the background region being a region in the sample image except the target region, and determining the second annotation information of each node according to the first node quantity, the second node quantity, and the prediction result; and training, by the device, the image segmentation model according to the second annotation information.

2. The method according to claim 1, wherein:

the first annotation information further comprises an estimation error value; and the determining, according to the area proportion and the total quantity of nodes in the graph structure data, the first node quantity corresponding to the target region and the second node quantity corresponding to the background region comprises:
   determining the first node quantity and the second node quantity according to the area proportion, the estimation error value, and the total quantity of nodes in the graph structure data.

3. The method according to claim 1, wherein the training the image segmentation model according to the second annotation information comprises:
   constructing a loss function according to the prediction result of each node and the second annotation information; and
   training the image segmentation model according to the loss function.

4. The method according to claim 1, wherein:
   the image segmentation model comprises a fully convolutional network; and
   the generating the graph structure data corresponding to the sample image comprises:
      performing feature extraction on the sample image by using the fully convolutional network, to obtain a feature corresponding to each pixel in the sample image,
      clustering the pixels in the sample image according to features corresponding to the pixels to obtain a superpixel division result, and
      constructing the graph structure data according to the superpixel division result, each superpixel in the superpixel division result being used as one node in the graph structure data.

5. The method according to claim 4, wherein the constructing the graph structure data according to the superpixel division result comprises:
   determining an edge between a first node and a second node according to location information of pixels respectively comprised in the first node and the second node; the first node and the second node being any two nodes in the graph structure data; and
   determining a weight of the edge according to a Euclidean distance between features respectively corresponding to the first node and the second node.

6. The method according to claim 5, wherein:
   for each node in the graph structure data, a feature corresponding to the node is an average value of features of pixels comprised in the node.

7. An apparatus for training an image segmentation model, the apparatus comprising:
   a memory storing instructions; and
   a processor in communication with the memory, wherein, when the processor executes the instructions, the processor is configured to cause the apparatus to perform:
      acquiring a sample image set, each image of the sample image set having first annotation information, the first annotation information comprising an area proportion of a target region in the sample image;
      generating graph structure data corresponding to a sample image in the sample image set, the graph structure data comprising multiple nodes, and each node comprising at least one pixel in the sample image;
      determining second annotation information of each node according to the graph structure data and the first annotation information corresponding to the sample image by using a graph convolutional network model, a granularity of the second annotation information being smaller than a granularity of the first annotation information, the graph convolutional network model being a part of an image segmentation model, by:
         obtaining a prediction result of each node according to the graph structure data by using the graph convolutional network model,
         determining, according to the area proportion and a total quantity of nodes in the graph structure data, a first node quantity corresponding to the target region and a second node quantity corresponding to a background region, the background region being a region in the sample image except the target region, and
         determining the second annotation information of each node according to the first node quantity, the second node quantity, and the prediction result; and
      training the image segmentation model according to the second annotation information.

8. The apparatus according to claim 7, wherein:
   the first annotation information further comprises an estimation error value; and
   the determining, according to the area proportion and the total quantity of nodes in the graph structure data, the first node quantity corresponding to the target region and the second node quantity corresponding to the background region comprises:
      determining the first node quantity and the second node quantity according to the area proportion, the estimation error value, and the total quantity of nodes in the graph structure data.

9. The apparatus according to claim 7, wherein the training the image segmentation model according to the second annotation information comprises:
   constructing a loss function according to the prediction result of each node and the second annotation information; and
   training the image segmentation model according to the loss function.

10. The apparatus according to claim 7, wherein:
    the image segmentation model comprises a fully convolutional network; and
    the generating the graph structure data corresponding to the sample image comprises:
       performing feature extraction on the sample image by using the fully convolutional network, to obtain a feature corresponding to each pixel in the sample image,
       clustering the pixels in the sample image according to features corresponding to the pixels to obtain a superpixel division result, and
       constructing the graph structure data according to the superpixel division result, each superpixel in the superpixel division result being used as one node in the graph structure data.

11. The apparatus according to claim 10, wherein the constructing the graph structure data according to the superpixel division result comprises:
    determining an edge between a first node and a second node according to location information of pixels respectively comprised in the first node and the second node; the first node and the second node being any two nodes in the graph structure data; and
    determining a weight of the edge according to a Euclidean distance between features respectively corresponding to the first node and the second node.

12. The apparatus according to claim 11, wherein:
for each node in the graph structure data, a feature corresponding to the node is an average value of features of pixels comprised in the node.

13. A non-transitory computer-readable storage medium, storing computer-readable instructions, wherein, the computer-readable instructions, when executed by a processor, are configured to cause the processor to perform:
acquiring a sample image set, each image of the sample image set having first annotation information, the first annotation information comprising an area proportion of a target region in the sample image;
generating graph structure data corresponding to a sample image in the sample image set, the graph structure data comprising multiple nodes, and each node comprising at least one pixel in the sample image;
determining second annotation information of each node according to the graph structure data and the first annotation information corresponding to the sample image by using a graph convolutional network model, a granularity of the second annotation information being smaller than a granularity of the first annotation information, the graph convolutional network model being a part of an image segmentation model, by:
obtaining a prediction result of each node according to the graph structure data by using the graph convolutional network model,
determining, according to the area proportion and a total quantity of nodes in the graph structure data, a first node quantity corresponding to the target region and a second node quantity corresponding to a background region, the background region being a region in the sample image except the target region, and
determining the second annotation information of each node according to the first node quantity, the second node quantity, and the prediction result; and
training the image segmentation model according to the second annotation information.

14. The non-transitory computer-readable storage medium according to claim 13, wherein,
the first annotation information further comprises an estimation error value; and
the determining, according to the area proportion and the total quantity of nodes in the graph structure data, the first node quantity corresponding to the target region and the second node quantity corresponding to the background region comprises:
determining the first node quantity and the second node quantity according to the area proportion, the estimation error value, and the total quantity of nodes in the graph structure data.

15. The non-transitory computer-readable storage medium according to claim 13, wherein the training the image segmentation model according to the second annotation information comprises:
constructing a loss function according to the prediction result of each node and the second annotation information; and
training the image segmentation model according to the loss function.

16. The non-transitory computer-readable storage medium according to claim 13, wherein:
the image segmentation model comprises a fully convolutional network; and
the generating the graph structure data corresponding to the sample image comprises:
performing feature extraction on the sample image by using the fully convolutional network, to obtain a feature corresponding to each pixel in the sample image,
clustering the pixels in the sample image according to features corresponding to the pixels to obtain a superpixel division result, and
constructing the graph structure data according to the superpixel division result, each superpixel in the superpixel division result being used as one node in the graph structure data.

17. The non-transitory computer-readable storage medium according to claim 16, wherein the constructing the graph structure data according to the superpixel division result comprises:
determining an edge between a first node and a second node according to location information of pixels respectively comprised in the first node and the second node; the first node and the second node being any two nodes in the graph structure data; and
determining a weight of the edge according to a Euclidean distance between features respectively corresponding to the first node and the second node.

* * * * *